United States Patent [19]
Downard, Jr.

[11] Patent Number: 4,961,677
[45] Date of Patent: Oct. 9, 1990

[54] TRUCK BED BULKHEAD

[76] Inventor: Marvin L. Downard, Jr., 8045 Broad St., Box 154, Thurston, Ohio 43157

[21] Appl. No.: 470,430

[22] Filed: Jan. 25, 1990

Related U.S. Application Data

[63] Continuation of Ser. No. 219,213, Jul. 15, 1988, abandoned.

[51] Int. Cl.$^5$ .................................................. B60P 7/14
[52] U.S. Cl. .......................................... 410/129; 410/94
[58] Field of Search ................... 410/31, 43, 94, 121, 410/122, 126, 127, 129, 130, 135, 140, 145; 296/37.6, 39.2; 119/11

[56] References Cited

U.S. PATENT DOCUMENTS

| | | | |
|---|---|---|---|
| 276,053 | 4/1883 | Lewis | 119/11 |
| 1,646,604 | 10/1927 | Wells | 119/11 |
| 2,565,997 | 3/1949 | Stone | 410/129 |
| 2,697,631 | 4/1952 | Miller | 410/140 |
| 2,989,011 | 6/1961 | Henrikson | 410/140 |
| 3,297,175 | 1/1967 | Gooding | 410/129 |
| 4,288,011 | 9/1981 | Grossman | 296/37.6 X |
| 4,343,578 | 8/1982 | Barnes | 410/151 |
| 4,396,325 | 8/1983 | Joice-Cavanagh | 410/129 |
| 4,507,033 | 3/1985 | Boyd | 410/130 X |
| 4,717,298 | 1/1988 | Bott | 410/129 |

Primary Examiner—Margaret A. Focarino
Assistant Examiner—Dean J. Kramer
Attorney, Agent, or Firm—Frank H. Foster

[57] ABSTRACT

A vertical removable bulkhead is specified for use in a freight carrier bed with sidewalls, particularly pickup trucks, to divide and support cargo. The bulkhead is constructed of a rigid material and is suspended by hangers from the top edges of opposing truck bed's sidewalls. The hangers are cantilevered extensions of the bulkhead wall part and are made an integral part thereof for suspension in the truck bed without the use of connecting hardware.

8 Claims, 2 Drawing Sheets

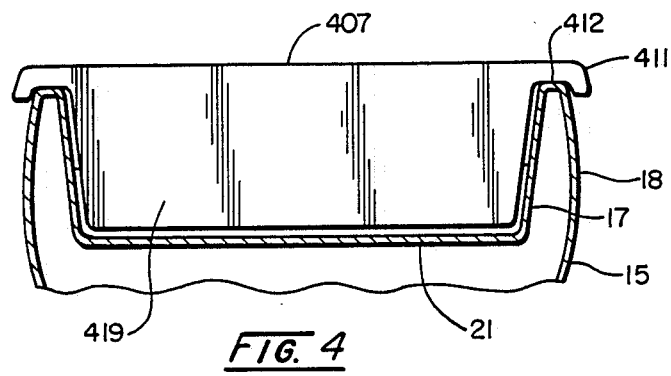
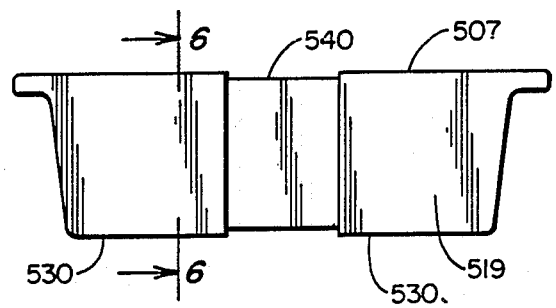
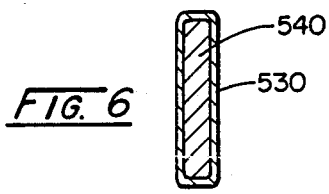

TRUCK BED BULKHEAD

This is a continuation of application Ser. No. 07/219,213, now abandoned, filed July 15, 1988.

TECHNICAL FIELD

This invention is a vertical, removable, truck bed bulkhead for use in a cargo carrier bed with opposing sidewalls. It is a suspended wall to wall cargo dividing and load bracing article for use with freight accommodations in transportation without attaching hardware.

BACKGROUND ART

The efficient transportation of goods in a cargo carrier requires consideration of a number of factors. Often different parts of a cargo are to be delivered to different destinations. In such a case, it is desirable to have some readily placeable and removable means such as a dividing wall for dividing the cargo. A dividing wall or bulkhead presents less opportunity for a misdelivery of a part of the cargo.

Another consideration is that the cargo often shifts during transportation. A shifting may cause cargo damage thereby creating the need for a structural wall or bulkhead to provide cargo stability. An ideal structural bulkhead would be easily and quickly placeable and removable yet stable for all highway conditions. A bulkhead that is securely fastened to a cargo or truck bed by fastener means provides a desirable strength but is inconvenient from the placement and removal viewpoint. The inconveniences of handling and adjusting fastener means causes a loss of time that could be more valuably spent in loading or transporting the goods. For these reasons, cargo bulkhead structures inherently compromise the competing values of stability against time and money.

Vertical bulkheads for dividing and supporting cargo in transport typically comprise rigid membranes or walls. They are supported on the floor of a cargo or truck bed and are secured in place with the use of fastener means. Fastener means comprising pins, bolts, hinges, springs and the like provide direct or friction connections of a bulkhead wall element to the cargo carrier. Others are supported by the floor of the cargo or truck bed and are slidingly stabilized with friction.

Prior art bulkheads have common inconveniences. One inconvenience is that the use of fastener means commonly requires the use of tools. The use of tools is inconvenient and slow in a cargo transportation situation where time in transit is a priority concern. Another problem is that cargo carrier beds accumulate dirt. The dirt accumulates in hardware recesses, tracks, and threads. Such accumulations contribute to the inconveniences of using such devices due to clogging that requires cleaning and additional time for placement. Dirt also reduces the advantage of friction connections. Another inconvenience relates to the use of multi-piece assemblies. Valuable loading and transit time is lost while assembling and adjusting multi-piece bulkheads and in securing them.

There is a need for a bulkhead that may be more quickly and easily placed and removed and which is free from the inconveniences associated with hardware and tools. The disclosed invention overcomes these problems with a rigid suspended bulkhead.

BRIEF DISCLOSURE OF INVENTION

This invention is a vertical, removable, truck bed cargo bulkhead. It comprises a wall element with horizontal hanger elements extending outward therefrom. It may be used to divide or to support cargo in a cargo or truck bed with opposing sidewalls, such as a pickup truck. In the preferred embodiment, it is a one-piece rigid bulkhead that is placed into or removed from the truck bed without the use of attachment or fastener means or tools.

There are two general embodiments of the invention. One is a one-piece rigid bulkhead. The other is an extensible rigid bulkhead. In either case, different integral bulkhead hanger means are specified for the suspension of the bulkhead wall means from the truck bed's sidewalls. The hanger means in general comprise horizontal cantilevered extensions from the bulkhead and are integral therewith. The bulkhead is therefore considered to comprise a wall element with the hanger elements extending rigidly therefrom.

The bulkhead may be suspended from truck bed's sidewalls to function as a simple divider as where different parts of a shipment are to be delivered to different destinations. It may be suspended from the sidewalls to function as a structural bulkhead to resist cargo sliding. In the latter case, sliding stability is increased by friction developed at the hanger bearing points and additionally by placing the bulkhead so that it abuts an interior wheel well or adjacent cargo.

BRIEF DESCRIPTION OF DRAWINGS

FIG. 4 is an elevational view of a truck bed bulkhead with extended downwardly turning hangers in a pickup truck bed.

FIG. 5 is an elevational view of an extensible truck bed bulkhead.

FIG. 6 is a sectional view of an extensible truck bed bulkhead.

Figure 1:
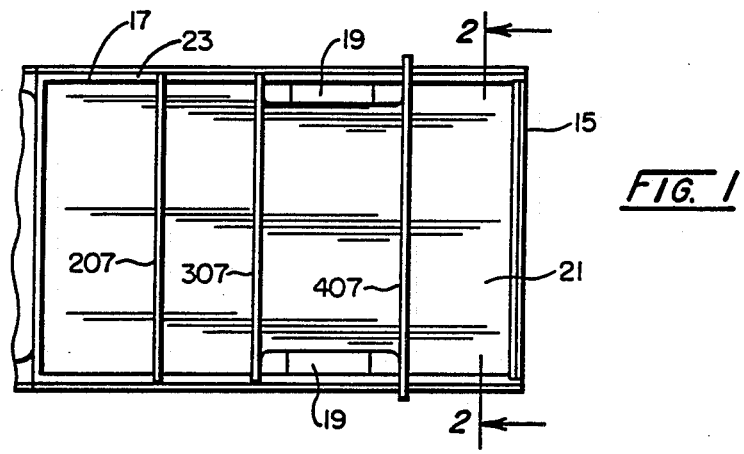
FIG. 1 is a plan view of a truck bed bulkhead in a pickup truck bed abutting wheel well covers.

In describing the preferred embodiment of the invention which is illustrated in the drawings, specific terminology will be resorted to for the sake of clarity. However, it is not intended that the invention be limited to the specific terms so selected and it is to be understood that each term includes all technical equivalents which operate in a similar manner to accomplish a similar purpose.

DETAILED DESCRIPTION

Referring to FIG. 1 there is shown a pickup truck bed 15 partitioned by the truck bed bulkheads 207, 307, 407, the bulkheads being more specifically described in the following text. In general, the bulkheads span between a truck bed's sidewalls 17. They may be laterally spaced as desired and they may be positioned adjacent to and abutting wheel well covers 19. In any event, a partitioned truck bed results. Section 2 of FIG. 1 is shown as FIGS. 2, 3 and 4.

Figure 2:
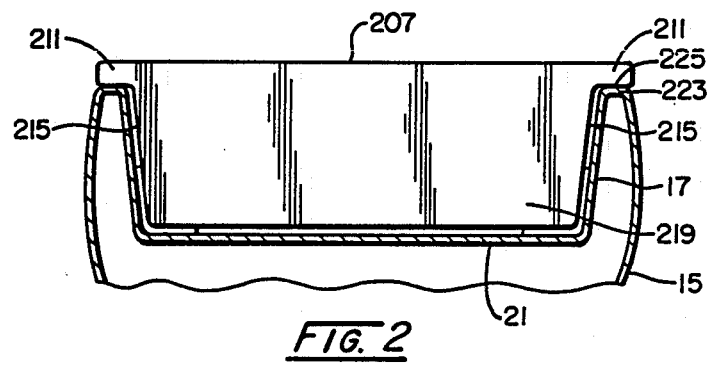
FIG. 2 is an elevational view of a truck bed bulkhead with rectilinear hangers in a pickup truck bed.

Referring specifically to FIG. 2, there is shown a rigid unitary bulkhead 207 with integral horizontal extensions 211 as hanger means. The bulkhead is shown placed in the bed of a pickup truck 15. The hangers 211 extend horizontally from each end 215 of the wall part 219. The hangers 211 are rigid and integral with the wall part 219 and are cantilevered out therefrom bearing directly on the top surfaces 23 of the truck bed's sidewalls 17. The bottom surfaces of the hangers 225 are substantially parallel with the top surfaces 23 of the sidewalls 17. The hanger cantilever length is approximately the width of the sidewalls. A small gap is provided between the wall member 219 and the truck bed, sidewalls 17 and the truck bed's floor 21.

The gaps along the sides are provided to make easy the insertion and removal of the bulkhead. The gap along the bottom is provided to allow for the underneath passage of dirt and to place the maximum weight at the hanger bearing points.

Figure 3:
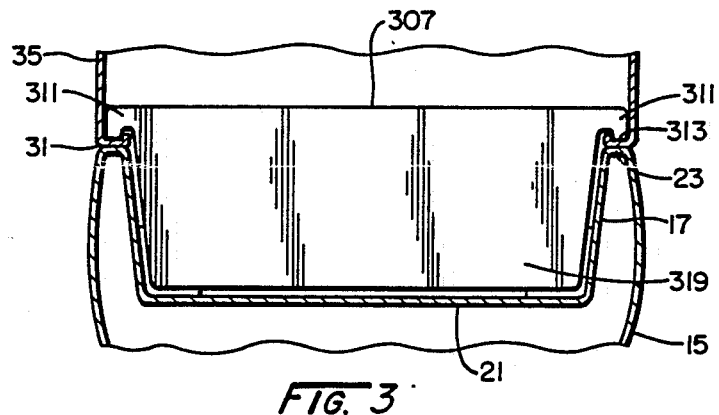
FIG. 3 is an elevational view of a truck bed bulkhead with downwardly turning hangers in a pickup truck bed.

Referring to FIG. 3, there is shown a unitary bulkhead 307 with downwardly turning rigid horizontal extensions 311 as hanger means. They are likewise integral with and cantilevered from each end of the wall part 319. The hanger ends 313 turn downward onto the top edges 23 of the sidewalls 17. This hanger arrangement is particularly suitable for use in cases where a track 31 has been installed on the top edges 23 of the sidewalls 17 as where a camper top 35 or truck cap has been installed over a pickup truck bed 15. In such cases, the bulkhead 307 fits within the enclosed area and is suspended on the inside of the camper top's outside walls. This hanger means is the best hanger mode contemplated by the inventor. A small gap is provided between the bulkhead wall member 319 and the truck bed's sidewalls 17 and the truck bed's floor 21.

Referring to FIG. 4, there is shown a unitary bulkhead 407 with downwardly turning rigid horizontal extensions 411 as hanger means. They are likewise integral with and cantilevered from each end of the wall part 419. In this configuration the extensions 411 continue over and beyond the outside walls 18 of the truck bed's sidewalls 17 and thereafter turn downward. The essentially horizontal bearing surfaces 412 of the extensions bear downward on the top edges 23 of the sidewalls 17 to carry the weight of the bulkhead 407. The downwardly turned ends 411 hook over the sidewalls 18 and contribute to stability.

Referring to FIGS. 5 and 6, there are shown views of an extensible bulkhead 507. The extensibility feature is added so that a bulkhead wall part 519 may be adjusted to span the interior dimensions of truck beds of different widths. Any of the aforementioned hanger means 211, 311, 411 may be used in conjunction with this extensibility feature. FIG. 5 is an elevational view of such a bulkhead 507 and FIG. 6 is a section therethrough.

With reference to FIGS. 5 and 6, the best mode contemplated by the inventor for a bulkhead wall means is an extensible rigid bulkhead wall means 519 comprising double wall sections 530 manufactured from a rigid plastic. In that case a parallel sleeve 540 is placed inside two parallel sections 530 of the wall part 519 and extensible adjustment is made by sliding one relative to the other. The sleeve 540 slidingly engages with the wall sections 530 for holding them in a parallel relationship. The multiplicity is then interlocked by interconnection means so that the sections are rigidly interlocked. When assembled, the bulkhead 507 has the same rigid unitary characteristics as the one-piece units 207, 307, 407. Extensibility may also be achieved by laminating and fastening individual parallel sheets for any desired width of truck bed.

The invention, in general, is manufactured from any substantially rigid material so that it can be conveniently lifted in and out of the cargo bed as a unit. The wall means and the hanger means have substantially the same rigidity. The shape and size of the bulkhead conforms substantially to the shape and size of the interior cross-section of a truck bed.

To operate the invention, it is only necessary to lift the bulkhead in or out of the truck bed as desired. It is preferred to place a bulkhead after the placement of cargo bound for a particular destination. Longitudinal support may be increased by abutting the bulkhead against an interior wheel well. Such an abutment decreases the incidence of cargo sliding in stabilities while in transit. In such a case, it is best to place an abutting bulkhead before cargo placement.

While certain preferred embodiments of the present invention have been disclosed in detail, it is to be understood that various modifications may be adopted without departing from the spirit of the invention or scope of the following claims.

I claim:

1. In a pickup truck of the type comprising a cargo bed, enclosing cargo bed opposing sidewalls, and wheel well cover means within the cargo bed, an improved partitioned cargo bed wherein the partitioning comprises a vertical wall and hanger means, the wall comprising a single vertical rigid wall spanning between opposing truck bed sidewalls to separate two adjacent portions of the truck bed, the sizes of which can be variably selected by the longitudinal positioning of the wall on the truck bed sidewalls, and suspended in unattached contact on the sidewalls' top edges by hanger means, and the hanger means comprising rigid integral horizontal and cantilevering extensions from each end of the wall for extending over the sidewalls' top edges for bearing thereon, the portion of the vertical rigid wall below the level of the hanger means extending outwardly beyond the innermost boundary of the wheel well cover means and stabilizingly abutting against the wheel well cover means.

2. A vertical truck bed positioning in accordance with claim 1 wherein the hanger means more particularly comprise rigid integral extensions from each end of the wall turning downward onto the top edges of the truck sidewalls.

3. A vertical truck bed bulkhead in accordance with claim 1 wherein the hanger means further comprises integral extensions from each end of the wall extending over top of the sidewalls' top edges and turning downward over the outer faces of the sidewalls.

4. A vertical truck bed bulkhead in accordance with claim 1 wherein the wall more particularly comprises a multiplicity of parallel rigid wall sections with interconnection means thereon for securing the sections in parallel interlocking contact relative to each other.

5. A vertical truck bed bulkhead comprising a single rigid wall for spanning between opposing truck bed sidewalls to separate two adjacent portions of the truck bed, the sizes of which can be variably selected by the longitudinal positioning of the wall on the truck bed sidewalls, and suspended from the sidewalls' top edges by hanger means, the hanger means comprising horizontal cantilevering extensions from each end of the wall for extending above the sidewalls' top edges for resting in unattached contact thereon.

6. A vertical truck bed bulkhead in accordance with claim 5 wherein the hanger means more particularly comprise rigid integral extensions from each end of the wall turning downward onto the top edges of the truck sidewalls.

7. A vertical truck bed bulkhead in accordance with claim 5 wherein the hanger means further comprises integral extensions from each end of the wall extending over top of the sidewalls' top edges and turning downward over the outer faces of the sidewalls.

8. A vertical truck bed bulkhead in accordance with claim 5 wherein the wall more particularly comprises a multiplicity of parallel rigid wall sections with interconnection means thereon for securing the sections in parallel interlocking contact relative to each other.

* * * * *